United States Patent

Turner

[11] Patent Number: 6,094,415
[45] Date of Patent: Jul. 25, 2000

[54] VECTOR DIVISION MULTIPLE ACCESS COMMUNICATION SYSTEM

[75] Inventor: Elbert L. Turner, San Jose, Calif.

[73] Assignee: Lockheed Martin Corporation, Bethesda, Md.

[21] Appl. No.: 08/667,082

[22] Filed: Jun. 20, 1996

[51] Int. Cl.[7] .................................................. H04J 11/00
[52] U.S. Cl. .......................................... 370/203; 370/431
[58] Field of Search .................................... 370/206, 207, 370/203, 431; 375/261–264, 298, 316, 324, 208, 268, 320; 332/103; 342/202, 400, 402

[56] References Cited

U.S. PATENT DOCUMENTS

| | | | |
|---|---|---|---|
| 3,497,625 | 2/1970 | Hleman et al. | 375/261 |
| 5,099,495 | 3/1992 | Mikoshiba et al. | 375/208 |
| 5,237,292 | 8/1993 | Chethik | 332/103 |
| 5,280,537 | 1/1994 | Sugiyama et al. | 370/206 |
| 5,426,438 | 6/1995 | Peavey et al. | 342/433 |
| 5,436,930 | 7/1995 | Bremer et al. | 375/295 |
| 5,463,355 | 10/1995 | Halloran | 332/103 |
| 5,666,352 | 9/1997 | Ohgoshi et al. | 370/206 |
| 5,684,834 | 11/1997 | Betts et al. | 375/298 |
| 5,793,759 | 8/1998 | Rakib et al. | 370/342 |

*Primary Examiner*—Huy D. Vu
*Assistant Examiner*—Jasper Kwoh
*Attorney, Agent, or Firm*—Kenneth W. Float

[57] ABSTRACT

Communication apparatus comprising a vector division multiple access communications system that uniquely extracts a selected communications link from a communications channel containing many simultaneous links. Each link is assigned a unique vector modulation coefficient using the transmit coefficient generator as its link connection address. The vector modulation coefficient establishes the phase and amplitude states of transmit and receive vector modulators employed in the transmitter and receiver, respectively. The receive vector modulator performs antipodal modulation of the link coefficient and remodulates the received modulated transmit waveform by removing the modulation that was applied by the transmit modulator. When a perfect match occurs, the receive modulator completely removes the modulation applied by the transmit modulator. Thus, a data demodulator following the receive vector modulator has no signal to demodulate and its output is therefore zero. Other than perfect matches between transmit and receive vector modulators result in output signals from the receiver data demodulator that are representative of a lack of match. When a data signal is added to the modulated transmit waveform generated by the transmit vector modulator and transmitter, the receive vector modulator no longer has a 100 percent correlation with the transmit vector modulator. The receiver vector modulator does not remove all of the signal modulation. The receive data demodulator then generates data output signals that represent the data signals transmitted by the transmitter.

7 Claims, 1 Drawing Sheet

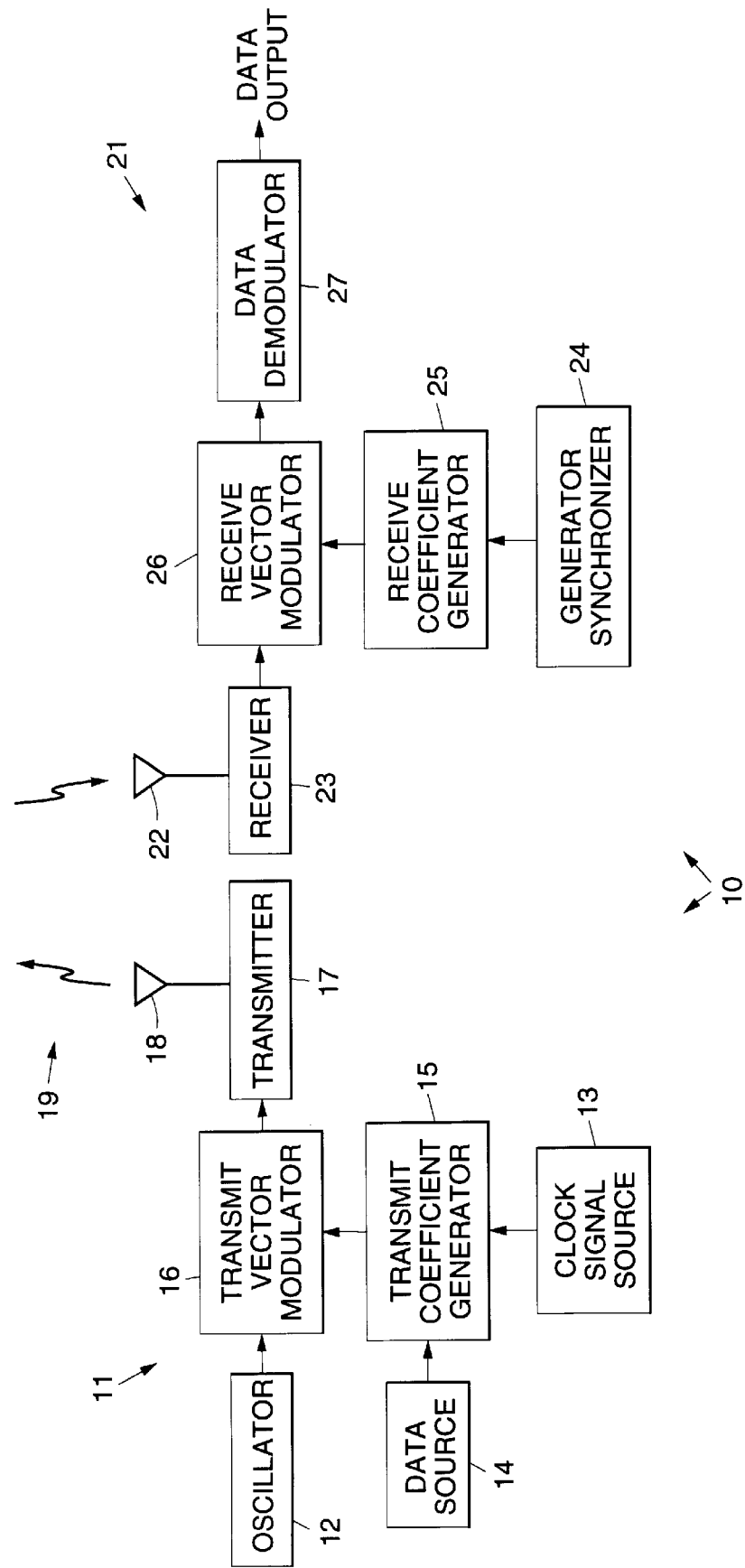

VECTOR DIVISION MULTIPLE ACCESS COMMUNICATION SYSTEM

BACKGROUND

The present invention relates generally to communications systems, and more particularly, to a vector division multiple access communications system.

Conventional multiple access communications systems include frequency division multiple access (FDMA) communications systems, time division multiple access (TDMA) communications systems, and coded division multiple access (CDMA) communications systems. The frequency division multiple access communications system is based on a unique frequency alignment. The time division multiple access communications system is based on unique time slot assignments. The coded division multiple access communications system is a based on a unique alignment of the coded sequence of data bits used for the modulation.

The present invention utilizes and expands on a modulation systems and techniques disclosed in U.S. Pat. No. 5,237,292 entitled "Quadrature Amplitude Modulation System with Compensation for Transmission System Characteristics", issued to Chethik and U.S. Pat. No. 5,463,355 entitled "Wideband Vector Modulator Which Combines Outputs of a Plurality of QPSK Modulators", issued to Halloran, both of which are assigned to the assignee of the present invention. These patents disclose systems that utilize vector modulation to implement bandwidth efficiency schemes.

Accordingly, it is an objective of the present invention to use vector modulation to provide for a vector division multiple access communications system.

SUMMARY OF THE INVENTION

To meet the above and other objectives, the present invention provides for a vector division multiple access (VDMA) communications system that provides a means for uniquely extracting a selected communications link from a communications channel containing many other simultaneous links. The present vector division multiple access communications system is based upon the assignment of individual links using the phase/amplitude vector of the modulated carrier.

The vector division multiple access communications system employs a vector modulator that is used at both the transmit and receive ends of the communications link. Vector modulators defined by U.S. Pat. Nos. 5,237,292 and 5,463,355 describe implementations of modulators that may be used in the present vector division multiple access communications system.

The transmit and receive vector modulators are driven by identical pre-assigned time varying coefficient generators. The receiver coefficient generator is time synchronized to the transmit coefficient generator by means of a closed loop remodulator that is controlled by a correlator circuit that compares the received signal to the pre-assigned generator coefficient. The phase of the remodulator is set such that when perfect correlation is achieved, the remodulator removes the modulation that had been applied to the carrier by the transmit coefficient generator.

The output of the receiver remodulator due to the transmitted signal is an unmodulated carrier signal. Less than perfect correlation results in an output signal that is modulated by the uncorrelated portion of the signal. Totally uncorrelated signals are modulated by the receive vector modulator over a bandwidth dictated by the receiver coefficient generator. A narrow band filter at the output of the receiver vector modulator provides discrimination between correlated and uncorrelated signals. The uncorrelated signals appear similar to spread spectrum signals relative to the correlated signal channel. The level of discrimination is also similar to that achieved in spread spectrum systems.

Data to be transmitted over the link is applied as a modulus to the transmit coefficient generator which then appears as a modulated signal at the output of the receive vector modulator. Demodulation of the data is achieved using a standard demodulator that follows the signal discrimination filter. Modulation by the data can be achieved by any of a variety of modulation schemes including amplitude modulation, phase modulation, frequency modulation, vector modulation or a combination of modulation schemes.

Data signals that are to be transmitted over the communications link are converted to a modulus that is input to a transmitter coefficient generator. The input signals applied to the transmit vector modulator is thus a multiplicative combination of the data modulus and the pre-assigned generator coefficient.

More specifically, the vector division multiple access communications system comprises a VDMA transmitter and a VDMA receiver. The VDMA transmitter includes a modulator for controlling the phase and amplitude of a carrier oscillator and a transmit coefficient generator that provides a digital input to the modulator. The data input is derived from a combination of the data to be transmitted and a unique coded sequence that is assigned to the specific communications channel. The output of the modulator is coupled to the transmitter which may include frequency converters and a power amplifier and an antenna for broadcasting a modulated transmit waveform over the common communications channel.

The VDMA receiver is connected to an antenna through conventional low noise amplifiers and frequency converters. The VDMA receiver includes a vector modulator similar to the transmitter vector modulator. However, the receiver vector modulator is adjusted such that when the transmitter and receiver vector modulators are driven with identical digital inputs, the receiver modulator removes (unmodulates) the modulation that was applied by the transmit vector modulator.

The VDMA receiver also includes a synchronizer connected to the output of the vector modulator. The synchronizer correlates the output signal with a replica of the unique coded sequence that is assigned to the transmitter. The correlator in the synchronizer generates an error signal that is applied to the data input port of the receiver vector modulator, establishing synchronization between the transmit and receive vector modulators. Synchronization only exists for the unique coded sequence assigned to the specific communications channel. All other sequences will result in a corresponding uncorrelated output from the vector modulator. A band pass filter on the output of the receiver vector modulator selects the desired communications channel and rejects all other channels that are operating in the same frequency band.

The VDMA transmit waveform is similar to a spread spectrum waveform except that vector modulation is employed instead of frequency spreading or phase spreading. Rules that apply to spread spectrum systems also generally apply to the present vector division multiple access communications system. Thus, multiple vector division multiple access links can simultaneously occupy a common channel and may be independently accessed. Processing techniques employed in spread spectrum systems for improving signal-to-interference ratios or jamming immunity may also generally be used with the present vector division multiple access communications system.

The advantages of the present vector division multiple access communications system over known prior art systems are that it provides an additional control parameter that may be used to separate different links.

BRIEF DESCRIPTION OF THE DRAWINGS

The various features and advantages of the present invention may be more readily understood with reference to the following detailed description taken in conjunction with the accompanying drawing, wherein like reference numerals designate like structural elements, and wherein the sole drawing figure illustrates a block diagram of a vector division multiple access communications system in accordance with the principles of the present invention.

DETAILED DESCRIPTION

Referring to the sole drawing figure, it illustrates a block diagram of a vector division multiple access (VDMA) communications system 10 in accordance with the principles of the present invention. The vector division multiple access communications system 10 comprises a VDMA transmitter 11 and a VDMA receiver 21.

The VDMA transmitter 11 includes a carrier oscillator 12 that is coupled to a transmit vector modulator 16. The transmit vector modulator 16 may be a vector modulator such as is disclosed in the above-cited U.S. Pat. Nos. 5,237,292 and 5,463,355, for example, both of which are incorporated herein by reference. A clock signal source 13 and a data source 14 are coupled to respective inputs of a transmit coefficient generator 15 whose output is coupled to the transmit vector modulator 16. The data source 14 provides data that is to be communicated by way of the communications system 10. The clock signal source 13 provides clock signals that clock the data into the transmit coefficient generator 15. The transmit coefficient generator 15 processes the data and clock signals to produce a unique vector modulation coefficient that is assigned to each link of the communications channel 19. The transmit vector modulator 16 generates a carrier signal that is modulated by the output of the transmit coefficient generator 15. The output of the transmit vector modulator 16 is coupled to a transmitter 17 that broadcasts a modulated transmit waveform by way of a transmit antenna 18, for example over a common communications channel 19.

The VDMA receiver 21 includes a receiver 23 having a receive antenna 22 for receiving the modulated transmit waveform broadcast from the VDMA transmitter 11. The output of the receiver 23 is coupled to a first input of a receive vector modulator 26. The receive vector modulator 26 may also be a vector modulator such as is disclosed in the above-cited U.S. Pat. Nos. 5,237,292 and 5,463,355, for example. A generator synchronizer 24 is provided that is used to synchronize the receiver vector modulator 26 to the transmit vector modulator 16. This synchronization is achieved by a closed loop that generates an error signal when the receive vector modulator does not remove the transmitter modulation, This error signal is used to correct the input to the receive vector modulator 26 until synchronization occurs. The output of the generator synchronizer 24 is coupled to a receive coefficient generator 25. The receive coefficient generator 25 is used to generate coefficients that remodulate the signal received by the receiver 23. The output of the receive coefficient generator 25 is coupled to a second input of the receive vector modulator 26. The receive vector modulator 26 remodulates the modulated transmit waveform using the coefficients generated by the receive coefficient generator 25. The output of the receive vector modulator 26 is coupled to a data demodulator 27 that demodulates the data to produce the original data that was derived from the data source 14.

In operation, each link using the common communications channel 19 is assigned a unique vector modulation coefficient using the transmit coefficient generator 15 as its link connection address. The vector modulation coefficient establishes the phase and amplitude states of the transmit and receive vector modulators 16, 26.

The transmit and receive modulators 16, 26 are controlled so that they are synchronized with each other. Synchronization is achieved in the receiver by means of a generator synchronizer 24 that correlates the output of the receive vector modulator 26 with a replica of the unique coded sequence that is assigned to the transmitter. The correlator output results in an error signal that is applied to the modulation input to vector modulator 26 that unmodulates the received carrier signal. This closed loop control establishes synchronization between the transmit and receive vector modulators 16, 26.

The receive modulator 26 thus performs a remodulation of the received signals (modulated transmit waveform) that removes the modulation that was applied by the transmit modulator 16. When a perfect match occurs, the receive modulator 26 completely removes the modulation applied by the transmit modulator 16. The receiver data demodulator 27 that follows the receive vector modulator 26 has no signal to demodulate and its output is therefore zero. Other than perfect matches between transmit and receive vector modulators 16, 26 results in outputs from the receiver data demodulator 27 that are representative of a lack of match. When a data signal is added to the modulated transmit waveform generated by the transmit vector modulator 16 and transmitter 17, the receive vector modulator 26 no longer has a 100 percent correlation with the transmit vector modulator 16. The receiver vector modulator 26 no longer removes all of the signal modulation. The receive data demodulator 27 then generates a data output that represents the data input from the data source 14 that was transmitted by the transmitter 17.

The vector modulation coefficient may be a fixed value but, more ideally is continuously varying and may be generated using a pseudo-random code generator 15 that comprises the transmit coefficient generator 15. This randomness provides an additional level of uniqueness for the communications link that increases the ability to uniquely select the desired link and decreases the ability for an unauthorized receiver to intercept the link unless the pseudo-random coded coefficient is made available to it.

Vector modulators 16, 26 built in accordance with the referenced patents to Chethik and Halloran have been shown to operate at clocking rates exceeding 2 GHz. The present VDMA communications system 10 employs modulators 16, 26 with similar architectures and may be implemented using the same technology. The present VDMA communications system 10 may therefore be used at operating rates up to several GHz.

Thus, a vector division multiple access communications system has been disclosed. It is to be understood that the described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A vector division multiple access (VDMA) communications system for transmitting signals derived from multiple links over a common communications channel, said system comprising:
   a VDMA transmitter comprising:
      an oscillator;
      a clock signal source for providing clock signals;
      a data source for providing data signals that are to be communicated over the common communications channel;
      a transmit coefficient generator coupled to the clock signal source and data source for processing the data and clock signals to produce a unique vector modulation coefficient that is assigned to each link of the common communications channel;
      a transmit vector modulator coupled to the oscillator and transmit coefficient generator for generating a carrier signal that is modulated by the vector modulation coefficient; and
      a transmitter coupled to an output of the transmit vector modulator for broadcasting a modulated transmit waveform over the common communications channel; and
   a VDMA receiver comprising:
      a receiver for receiving the modulated transmit waveform broadcast by the VDMA transmitter;
      a receive vector modulator coupled to an output of the receiver;
      a generator synchronizer for generating control signals that synchronize the transmit and receive vector modulators;
      a receive coefficient generator coupled between the generator synchronizer and the receive vector modulator for generating coefficients that are used to remodulate the received transmit waveform;
      and wherein the receive vector modulator remodulates the modulated transmit waveform using the coefficients generated by the receive coefficient generator; and
      a data demodulator coupled to the receive vector modulator for demodulating the received transmit waveform to produce the data signals derived from the data source.

2. The system of claim 1 wherein the transmit coefficient generator comprises a pseudo-random code generator.

3. A vector division multiple access (VDMA) communications system for transmitting signals derived from multiple links over a common communications channel, said system comprising:
   a VDMA transmitter comprising:
      a data source for providing data signals that are to be communicated over the common communications channel;
      transmit coefficient generator means for processing the data signals to produce a unique vector modulation coefficient that is assigned to each link of the common communications channel;
      a transmit vector modulator for generating a carrier signal that is modulated by the vector modulation coefficient; and
      a transmitter for broadcasting a modulated transmit waveform over the common communications channel; and
   a VDMA receiver comprising:
      a receiver for receiving the modulated transmit waveform broadcast by the VDMA transmitter;
      a generator synchronizer for generating control signals that synchronize the transmit and receive vector modulators;
      a receive coefficient generator for generating coefficients that are used to remodulate the received transmit waveform;
      a receive vector modulator for remodulating the modulated transmit waveform using the coefficients generated by the receive coefficient generator; and
      a data demodulator for demodulating the received transmit waveform to produce the data signals derived from the data source.

4. The system of claim 3 wherein the transmit coefficient generator means comprises a pseudo-random code generator.

5. A vector division multiple access (VDMA) communications system for transmitting signals derived from multiple links over a common communications channel, said system comprising:
   a VDMA transmitter comprising:
      a data source for providing data signals that are to be communicated over the common communications channel;
      a transmit coefficient generator for generating a unique vector modulation coefficient that is assigned to each link of the common communications channel;
      a transmit vector modulator for generating a carrier signal that is modulated by the vector modulation coefficient; and
      a transmitter for broadcasting a modulated transmit waveform over the common communications channel; and
   a VDMA receiver comprising:
      a receiver for receiving the modulated transmit waveform broadcast by the VDMA transmitter;
      a receive vector modulator coupled to an output of the receiver;
      a generator synchronizer for generating control signals that synchronize the transmit and receive vector modulators;
      a receive coefficient generator for generating coefficients that are used to remodulate the received transmit waveform;
      and wherein the receive vector modulator remodulates the modulated transmit waveform using the coefficients generated by the receive coefficient generator; and
      a data demodulator for demodulating the received transmit waveform to produce the data signals derived from the data source.

6. The system of claim 5 wherein the transmit coefficient generator comprises a pseudorandom code generator.

7. The system of claim 5 wherein the VDMA transmitter further comprises:
   an oscillator and a clock signal source for providing clock signals, each of which are coupled to the transmit coefficient generator.

* * * * *